April 16, 1963  R. T. HEADRICK ET AL  3,085,537
HYDROFOIL APPARATUS
Filed April 18, 1960  3 Sheets-Sheet 1
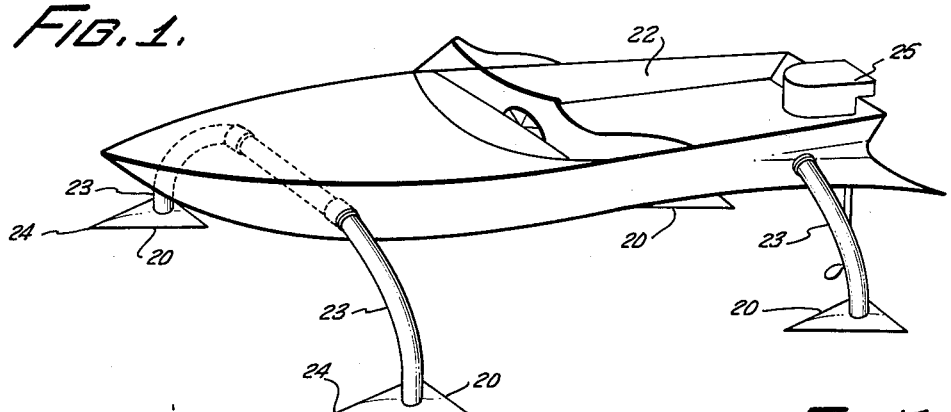
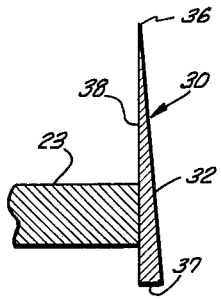
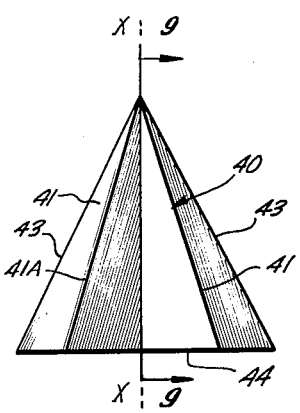
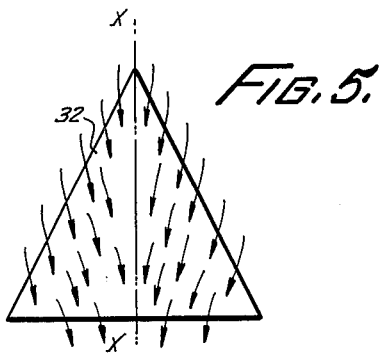
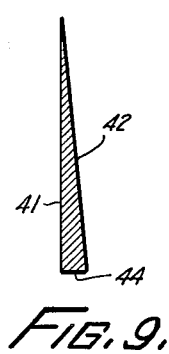
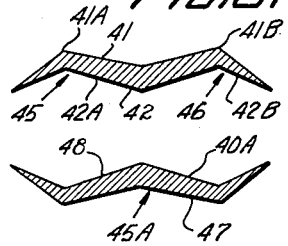
INVENTORS.
RICHARD T. HEADRICK
EDWARD E. HEADRICK
BY
Christie, Parker & Hale
ATTORNEYS.

April 16, 1963  R. T. HEADRICK ET AL  3,085,537
HYDROFOIL APPARATUS
Filed April 18, 1960  3 Sheets-Sheet 2
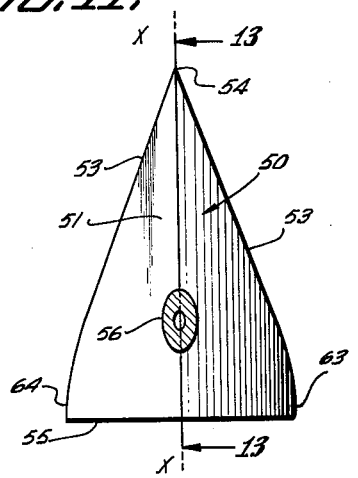
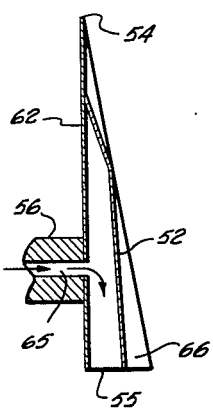
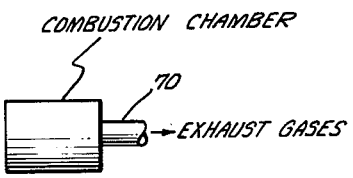
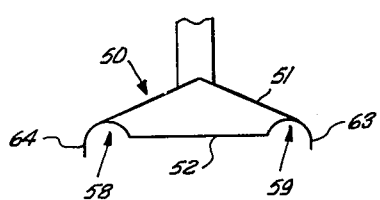
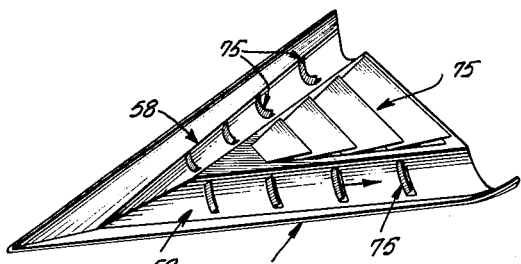
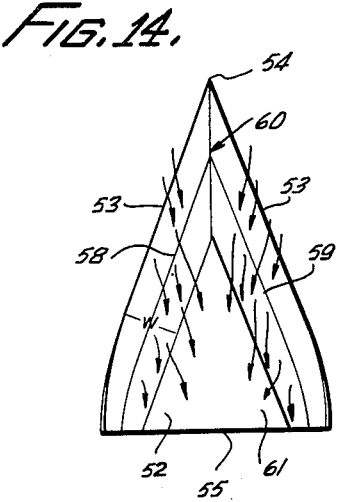
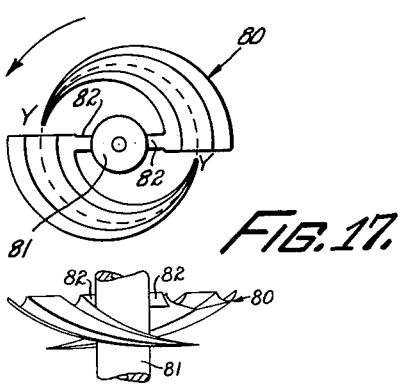
INVENTORS.
RICHARD T. HEADRICK
EDWARD E. HEADRICK
BY
Christie, Parker & Hale
ATTORNEYS.

April 16, 1963 R. T. HEADRICK ET AL 3,085,537
HYDROFOIL APPARATUS
Filed April 18, 1960 3 Sheets-Sheet 3

INVENTORS.
RICHARD T. HEADRICK
EDWARD E. HEADRICK
BY
Christie, Parker & Hale
ATTORNEYS.

United States Patent Office 3,085,537
Patented Apr. 16, 1963

3,085,537
HYDROFOIL APPARATUS
Richard T. Headrick, La Canada, Calif. (916 Crestfield, Duarte, Calif.), and Edward E. Headrick, 4900 Crown Ave., La Canada, Calif.
Filed Apr. 18, 1960, Ser. No. 22,795
18 Claims. (Cl. 114—66.5)

The present invention relates to hydrofoil apparatus.

Heretofore, hydrofoils for supporting high-speed vessels or boats in water have been patterned after high lift section low-speed aircraft wings in which the chord or distance between the leading and trailing edges is substantially constant throughout the span of the wing. Many of the problems involved in using such conventional aircraft wing structures to produce lift by relative motion in water have been disclosed in our co-pending patent application, entitled "Hydrofoil Apparatus," Serial No. 22,871 filed April 18, 1960.

Most of the lift produced by a conventional hydrofoil is derived from the upper surface. As a result, separation of water from the upper surface of such a foil (i.e. when the hydrofoil breaks the surface of the water), completely destroys the majority of the lift (i.e. 90%) produced by the foil. To overcome this problem some prior art hydrofoils have been patterned after conventional high lift section low-speed aircraft wings having a positive dihedral (e.g. each wing or half section of the hydrofoil extends upwardly with respect to the horizontal plane of the foil). Such positive dihedral construction prior art hydrofoils have improved the basic stability of the foil to some extent since a portion of the hydrofoil will theoretically remain under water for any speed even though a large portion of the hydrofoil (the upwardly projecting ends) may extend out of the water. Thus as the speed of such a hydrofoil is increased the hydrofoil is raised in the water until the submerged portion provides adequate lifting forces to support the boat or other vessel. This increase in stability is gained only through a decrease in the lifting force created on the bottom surface of the hydrofoil (the water flowing under the hydrofoil tends to flow toward the wing tips thereby decreasing the velocity of flow and pressure exerted by the water over the central portion of the lower surface). This causes the lift to drag ratio (total lifting force divided by the total drag force of the foil) and the efficiency of the hydrofoil to be low.

Positive dihedral construction hydrofoils of the prior art have one additional disadvantage. At relatively high speeds the wing tips extend out of the water (to provide the increased stability as explained above) and permit air to be drawn down the sides of the wing along the low-pressure region on the top surface thereof, thereby decreasing the lift on the upper surface of the hydrofoil and the resultant lift to drag ratio. This problem becomes acute at high speeds. As a result of the two problems discussed above, conventional positive dihedral construction hydrofoils are inefficient and stable only over a small speed range.

The above disadvantages are overcome by the present invention which provides a hydrofoil apparatus that is highly efficient and completely stable when running on the surface or under the surface of water with little change in the lifting and drag forces produced by the apparatus. Such hydrofoil apparatus is extremely useful in high-speed ocean-going boats. The hydrofoil apparatus of this invention also has a very wide range of permissible angles of incidence or attack which permits the apparatus to be used at low speeds (with a large angle of attack for high lift), and at very high speeds (with a small angle of attack), for supporting a boat in or above the surface of water.

In accordance with this invention, a hydrofoil apparatus for producing lift by motion in a liquid medium, such as water, is provided which includes a delta-shaped body member having an upper and lower surface which converge to form a pair of thin leading edges disposed symmetrically with respect to an axis aligned with the direction of movement of the body member. The leading edges intersect at the front of the body member. The lower surface is constructed to have a concave portion forming at least one channel running substantially the length of the body member for increasing the velocity and the pressure of the liquid flowing under the bottom surface to thereby increase the lifting forces produced by the body member.

The invention is explained in more detail in connection with the accompanying drawing in which:

FIG. 1 is a perspective view of a boat and a hydrofoil apparatus in accordance with this invention;

FIG. 2 is a plan view of a hydrofoil apparatus constructed in accordance with this invention;

FIG. 3 is an end view of the apparatus of FIG. 2;

FIG. 4 is a horizontal sectional view of the apparatus of FIG. 2 taken along lines 4—4;

FIG. 5 is a bottom view of the apparatus of FIG. 2 showing the pattern of liquid flow under the bottom surface;

FIG. 6 is an end view of the apparatus of FIG. 4 showing an alternative embodiment;

FIG. 7 is a plan view of another alternative embodiment of the apparatus of this invention;

FIG. 8 is an end view of the apparatus of FIG. 7;

FIG. 9 is a horizontal cross-sectional view of the apparatus of FIG. 7 taken along lines 9—9;

FIG. 10 is an end view of the apparatus of FIG. 7 showing a modification thereof;

FIG. 11 is a plan view of the preferred embodiment of the present invention;

FIG. 12 is an end view of the apparatus of FIG. 11;

FIG. 13 is a horizontal cross-sectional view of the apparatus of FIG. 11 taken along lines 13—13;

FIG. 14 is a bottom view of the apparatus of FIG. 11 showing the pattern of liquid flow;

FIG. 15 is a block diagram of a combustion chamber for use with the apparatus of this invention;

FIG. 16 is a bottom view of the apparatus of FIG. 11 showing a modification thereof;

FIG. 17 is a plan view of an alternative embodiment of the apparatus of this invention illustrating the use of the apparatus as a propeller blade;

FIG. 17A is a side view of the apparatus of FIG. 17;

Figure 18:
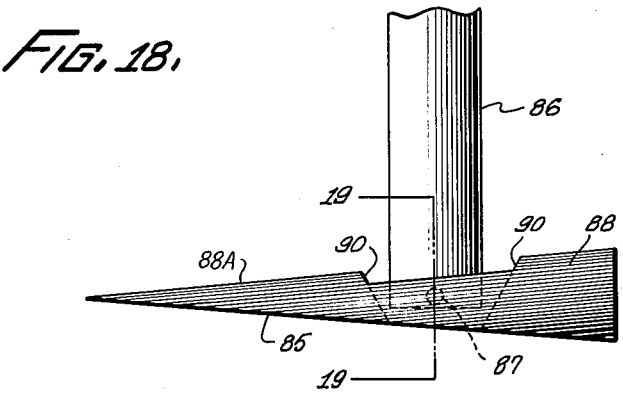
FIG. 18 is a side view of an adjustable strut assembly in accordance with this invention.

Referring now to the drawings and more specifically to FIG. 1 there is shown plurality of body members 20 for supporting a boat 22 in the water by means of struts 23. The struts 23 position the body members 20 so that the front ends 24 thereof are aligned with the direction of movement of the boat 22 through the water. A source of power such as an outboard motor 25 is connected to the boat 22 for propelling the boat through the water in a well-known manner. Suitable means (described in detail in our co-pending application referred to above), may be provided for adjusting the angle of attack of the body members 20 relative to the water by rotating the struts 23 relative to the boat or by rotating body members 20 relative to the struts 23.

Referring now to FIGS. 2, 3 and 4, there is shown in detail a hydrofoil apparatus of the present invention. A body member 30 formed of any suitable material may be secured to a vessel (i.e. the boat 22) by means of struts 23 to lift the vessel in a liquid medium such as water. The body member 30 has an upper surface 31 and a lower surface 32 which converge to form a pair of thin or sharp leading edges 34 disposed symmetrically with respect to a longitudinal axis X—X of the body member and intersecting at the front end 36 thereof. A trailing edge 37 extends between the leading edges and forms the rear of the body member. The upper surface 31 is composed of a pair of side portions having substantially flat surfaces which extend from the respective leading edges upwardly to a ridge 38 disposed along the longitudinal axis of the body member. The upper surface 31 has a straight contour along each longitudinal cross-section (each cross-section parallel to the longitudinal axis X—X), and has a convex contour along each transverse cross-section (each cross-section perpendicular to the longitudinal axis). The bottom surface 32 is composed of a pair of side portions having flat surfaces which extend from the respective leading edges 34 to a junction 49 along the longitudinal axis of the body member. (See FIG. 3.) The bottom surface 32 is concave in shape along each transverse cross-section and forms a channel running the entire length of the body member from the front 36 to the trailing edge 37 thereof.

In operation the water flowing under the body member 30 is directed toward the longitudinal axis X—X (as indicated by the arrows) and thus increases in velocity toward the rear portion of the body member. (See FIG. 5.) This increase in the velocity of the water flow under the lower surface of the body member 30 results in an increased pressure on the lower surface and large resultant lift on the body member 30. The top surface 31 of the body member 30 produces only a small portion of the over-all lift. However, since the distance between the upper and lower surfaces 31 and 32 respectively increases along each longitudinal axis from the leading edges to the trailing edge 37 of the body member, the angle of attack of the upper surface 31 is small compared to the angle of attack of lower surface 32. This produces large lifting forces in the lower surface 32 and very small drag forces on the upper surface 31. Since the hydrofoil apparatus of FIGS. 2, 3 and 4 derives most of its lift from the pressure of the water on the lower surface 32, the apparatus may be used with the body member 30 riding below or on the surface of the water with negligible change in the net lifting or drag forces produced. For this reason the apparatus of FIGS. 2, 3 and 4 is extremely useful in supporting high-speed ocean-going vessels since the body member 30 will travel through many waves and thus stabilize the boat in pitch and roll.

Referring now to FIG. 6, there is shown an alternative embodiment of FIGS. 2, 3 and 4, in which the upper and lower surfaces 31-A and 32-A, respectively, of a body member 30-A are smooth curves of convex and concave configuration, respectively, along each transverse cross-section.

It is not necessary that the body member of the hydrofoil apparatus of this invention have a lower surface which defines only one channel as has been described in connection with the apparatus of FIGS. 2, 3 and 4. For example, a body member 40 is illustrated in FIGS. 7 and 8 which includes a top surface 41 and a lower surface 42 converging at a pair of thin leading edges 43 and at a trailing edge 44. The bottom surface 42 of the body member 40 is constructed to define a pair of channels indicated generally by the reference numerals 45 and 46 (FIG. 8) which extend the entire length of the body member 40. The lower surface 42 is composed of a pair of side portions 42A and 42B. Each of the side portions 42A and 42B of the lower surface 42 are concave in shape along each transverse cross-section to form the channels 45 and 46 as shown in FIG. 8. The top surface 41 forms two ridge portions 41A and 41B, which extend above the channels 45 and 46.

In the operation of the hydrofoil apparatus of FIGS. 7, 8 and 9, each of the channels 45 and 46 in the lower surface 42 of the body member 40 serve to increase the velocity of the flow within the respective channels and the resultant pressure of the water on the lower surface 42. This hydrofoil apparatus has a very large lift to drag ratio and is very useful in supporting high-speed ocean-going vessels for the reasons explained in the connection of the apparatus of FIGS. 2, 3 and 4.

A modification of the hydrofoil apparatus of FIGS. 7, 8 and 9 is illustrated in FIG. 10. The hydrofoil apparatus of FIG. 10 is identical to the apparatus shown in FIGS. 7, 8 and 9, except the top and bottom surfaces have been reversed as illustrated. In FIG. 10 the body member 40A includes a bottom surface 47 and a top surface 48. The lower surface 47 forms only one channel 45A running the length of the body member 40A.

Referring now to FIGS. 11, 12, 13 and 14, there is shown a preferred embodiment of the hydrofoil apparatus constructed in accordance with this invention. A body member 50 includes a top surface 51 and a lower surface 52 which converge to form a pair of thin leading edges 53 intersecting at the front 54 of the body member 50. A trailing edge 55 extends between the leading edges 53 at the rear of the body member 50. The strut 56 is connected to the top of the body member 50 for anchoring the body member 50 to a boat or other suitable vessel. The bottom surface 52 of the body member 50 is constructed as shown in FIGS. 12 and 14 to form a pair of semi-cylindrical channels 58 and 59 extending substantially parallel to a respective leading edge of the body member and for a substantial portion of the length of the leading edge. The width of each of the channels (designated by W in FIG. 14) is approximately one-fourth to one-third the length of the trailing edge 55. The channels 58 and 59 intersect at the front of the body member to form a single channel 60 adjacent to the front 54 of the body member. The lower surface 52 includes a flat triangular portion 61 which extends between the channels 58 and 59.

The top surface 51 of the body member 50 is composed of two substantially flat portions which extend from the leading edges to a ridge 62 running along the top surface parallel to the longitudinal axis X—X of the body member. The top and bottom surfaces are canted downwardly adjacent to the junction of the leading edges and the trailing edge to form a pair of stabilizing fences 63 and 64 which extend below the flat portion 61 to increase the efficiency of the body member.

The body member 50 may be conveniently formed by two sheets of suitable material, such as metal or plastic, with the first sheet being shaped to form the top surface 50 and the second sheet being shaped to form the triangular portion 61 of the bottom surface 52 and a portion of the channels 58 and 59 as shown more specifically in FIGS. 12 and 14. The space between the top and bottom surfaces 51 and 52 may be open and connected to the atmosphere or a source of gas under pressure by means of a bore 65 in the strut 56 as shown in FIG. 16. If the bore 65 is open to atmosphere, the suction created behind the trailing edge 55 of the body member 50 during operation will draw air down through the bore 65 into the space 66 between the top and bottom surfaces of the body member and into the low pressure region behind the trailing edge 55 to decrease the drag forces exerted on body member 50. If desired, gas may be driven down the bore 65 by connecting the bore 65 to an outlet 70 of a suitable combustion chamber 71 of FIG. 15 which may be located on the boat or other vessel being supported by the body member 50. Combustion gases may be fed to the combustion chamber 71 in a well-known manner. Such exhaust gases may be utilized to help propel the body member 50 and the boat through the water.

To further increase the efficiency of the hydrofoil apparatus of FIGS. 11-14, a plurality of louvres 75 may be formed on the inner side of the channels 58 and 59 and in the flat triangular plate 61 as shown in FIG. 16. The louvres 75 are in fluid communication with the space 66 so that gases introduced into space 66 will flow out of the louvres 75. This configuration of the hydrofoil apparatus of FIGS. 11–14 is very efficient since gas flows over a large portion of the lower surface of the body member 50 thereby decreasing the drag forces.

The hydrofoil apparatus of the present invention has also been found very useful for use as a propeller to produce lift by motion in a liquid medium such as water. In FIG. 17 a pair of body members 80 are connected to a shaft 81 by means of struts 82 for driving or pumping a liquid medium. The body members 80 may be similar to the body members 30, 40 or 50 (of FIGS. 2, 7, 11) with the leading edges thereof curved and disposed symmetrically with respect to a circular axis Y—Y aligned with the direction of travel of the body member. The shaft 81 may be coupled to a suitable source of power for rotating the body members 80 in a counterclockwise direction as shown. The angle of attack or of the pitch of the body members 80 is illustrated in FIG. 17A. However such angle of attack may be varied, depending upon the speed of rotation of the body members 80 and the type of fluid to be pumped.

Figure 19:
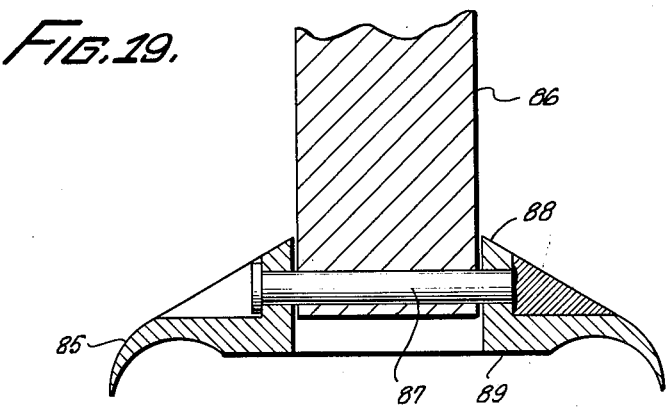
FIG. 19 is an enlarged cross-sectional view of the apparatus of FIG. 18 taken along lines 19—19.

Referring now to FIGS. 18 and 19, there is shown an adjustable strut assembly of the present invention in which a body member 85 is rotatably mounted on a strut 86 by means of a pin 87. Pin 87 is suitably secured within the body member 85 between the highest projection of the upper surface 88 or ridge 88A and the bottom surface 89 thereof. The body member 85 may be similar in construction to the body members 30, 40, and 40A discussed above. The body member 85 is free to rotate through a predetermined angle about the pin 87. A pair of shoulders 90 formed in the body member 85 cooperate with the strut 86 to limit the rotation of the body member. The location of the pin 87 between the highest projection 88A of the upper surface and lower surface of the body member greatly increases the stability of the body member and prevents rapid changes in the angle of attack of the body member.

Various modifications of the hydrofoil apparatus of the present invention will be apparent to those skilled in the art. For example, the degree of curvature of the top and bottom surface of the body members 30, 40 and 50 may be varied according to the stability and lift requirements of the hydrofoil apparatus. The hydrofoil apparatus of this invention may be employed to support any vessel (i.e. airplane or submarine) in water. The body members 30, 40 and 50 may also be utilized as water skis for directly supporting a person above the surface of the water. There has thus been disclosed an improved hydrofoil apparatus which is highly efficient, stable, versatile and relatively inexpensive to manufacture.

We claim:

1. A hydrofoil apparatus for producing lift by motion in a liquid medium comprising a delta-shaped body member having an upper and lower surface which converge to form a pair of thin leading edges disposed symmetrically with respect to the longitudinal axis of the body member and intersecting at the front end thereof, the lower surface having a concave portion to form at least one channel running substantially the length of the body member for increasing the velocity of the liquid flowing under the lower surface to thereby increase the lifting force produced by the body member, the body member being constructed so that the distance between the upper and lower surfaces increases along substantially each longitudinal cross section from each of the leading edges to the rear of the body member to produce large lifting forces on the lower surface of the body member with small resultant drag forces on the upper surface of the body member.

2. A hydrofoil apparatus as defined in claim 1 wherein the body member is constructed so that the upper surface thereof is convex in shape along substantially each transverse cross-section.

3. A hydrofoil for producing lift by motion in a liquid medium comprising a delta-shaped body member, having an upper and lower surface which converge to form a pair of thin leading edges intersecting at the front of the body member and disposed symmetrically with respect to the longitudinal axis thereof, the bottom surface defining two channels running substantially the length of the body member, each of the channels extending substantially parallel to one of the leading edges of the body member so that the channels intersect at the front of the body member, the body member being constructed so that the distance between the upper and lower surfaces increases along substantially each longitudinal cross section from each of the leading edges to the rear of the body member to produce large lifting forces on the lower surface of the body member with small resultant drag forces on the upper surface of the body member.

4. A hydrofoil apparatus, as defined in claim 3, wherein the upper and lower surfaces of the body member extend downwardly adjacent the leading edges.

5. The hydrofoil apparatus, as defined in claim 4, wherein the upper surface of the body member includes at least one convex portion along each transverse cross-section.

6. A hydrofoil apparatus for producing lift by motion in a liquid medium comprising a delta-shaped body member having an upper and lower surface which converge to form a pair of sharp leading edges intersecting at the front of the body member and a trailing edge connected between the leading edges at the rear of the body member, the upper surface of the body member being composed of a pair of side portions having substantially flat surfaces which extend from the respective leading edges upwardly to a ridge disposed along the longitudinal axis of the body member, the lower surface being constructed to form a pair of channels extending parallel to a respective leading edge of the body member and for a substantial length thereof, the pair of channels intersecting at the front of the body member to form a single channel adjacent to the intersection of the leading edges, the lower surface being further constructed to define a substantially flat triangular surface portion extending between the channels with the apex of the triangular surface being disposed along the longitudinal axis of the body member and adjacent the front end thereof.

7. A hydrofoil apparatus as defined in claim 6 wherein the pair of channels formed in the lower surface are substantially semi-cylindrical in shape.

8. A hydrofoil apparatus, as defined in claim 6, wherein the body member is constructed to define a hollow space extending between the upper and lower surfaces and opening at the rear of the body member and including means coupled to the body member for introducing a fluid material into said space.

9. A hydrofoil apparatus, as defined in claim 8, wherein the lower surface is constructed to define a plurality of louvres within each of the channels and in fluid communication with the space between the upper and lower surfaces of the body member, the louvres being arranged to deflect the flow of the fluid material which is injected into the space between the upper and lower surfaces toward the rear of the body member to decrease the drag forces on the lower surface.

10. An apparatus for producing lift by motion in a liquid medium comprising a body member having an upper and lower surface which converge to form a pair of sharp leading edges intersecting at the front of the body member and being symmetrically disposed with respect to a central axis through the body member which is aligned with the direction of the movement of the body member through the liquid medium, the lower surface forming a pair of channels extending over a substantial portion of the length of the body member, each of the channels extending substantially parallel to one of the leading edges of the body member so that the channels intersect at the front of the body member, the body member being constructed so that the distance between the upper and lower surfaces increases along substantially each longitudinal cross section from each of the leading edges to the rear of the body member to produce large lifting forces on the lower surface of the body member with small resultant drag forces on the upper surface of the body member.

11. An apparatus as defined in claim 10 wherein the central axis is circular and including a shaft and a strut member connected between the shaft and the body member.

12. An apparatus for producing lift by motion in a liquid medium comprising at least two body members, each of the body members having a first and second surface which converge to form a pair of thin leading edges intersecting at the front of the body member and being symmetrically disposed with respect to a circular axis through the body member, the second surface forming a pair of channels, running substantially the length of the body member for increasing velocity of the liquid flowing past the second surface to thereby increase the lifting force produced by the body member, each of the body members being constructed so that the distance between the upper and lower surfaces increases along substantially each longitudinal cross section from each of the leading edges to the rear of the body member to produce large lifting forces on the lower surfaces of the body members with small resultant drag forces on the upper surfaces of the body members, each of the channels extending substantially parallel to one of the leading edges of the respective body members so that the channels intersect at the front of the body member, a shaft disposed adjacent to the body members and a strut connected individually between each of the body members and the shaft whereby the body members will rotate along the circular axis thereof when the shaft is rotated.

13. A hydrofoil apparatus for producing lift by motion in a liquid medium comprising a delta shaped body member having an upper and lower surface which converge to form a pair of sharp leading edges intersecting at the front of the body member and a trailing edge connected between the leading edges at the rear of the body member, the lower surface being constructed to form a pair of channels extending generally parallel to a respective leading edge of the body member and for a substantial length thereof so that the channels intersect at the front of the body member to form a single channel adjacent to the intersection of the leading edges, the lower surface being further constructed to define a substantially flat triangular surface extending between the channels with the apex of the triangular surface being along the longitudinal axis of the body member and adjacent the front end thereof so that the distance between the triangular portion of the bottom surface and the top surface increases along each longitudinal cross-section from the front to the rear of the body member.

14. A hydrofoil apparatus as defined in claim 13 wherein the body member is constructed to define a hollow space extending between the upper surface and the flat triangular portion of the lower surface and opening at the rear of the body member and including means coupled to the body member for introducing a fluid material into such space.

15. A hydrofoil apparatus as defined in claim 14 including a strut connected to the upper surface of the body member, the strut defining a fluid passageway through a portion thereof, means for connecting the fluid passageway in the strut to the hollow space in the body member and means for opening the passageway in the strut to atmosphere.

16. A hydrofoil apparatus for lifting a body in water comprising a plurality of delta shaped body members, each of the body members having an upper and lower surface which converge to form a pair of thin leading edges disposed symmetrically with respect to the longitudinal axis of the body member and intersecting at the front end thereof, the lower surface of each of the body members defining at least two concave portions which form at least two longitudinal channels running substantially the length of the respective body member, each of the body members being further constructed so that the distance between the upper and lower surfaces increases along substantially each longitudinal cross section to increase the lifting forces created on the bottom surface of the body members and decrease the drag forces created on the top surfaces of the body members, a strut member individually associated with each of the body members, means for connecting one end of each of the strut members to the body, means for connecting the other end of each of the struts to the respective body member to position the body members so that the front ends thereof are aligned with the direction of travel of the body.

17. A hydrofoil apparatus as defined in claim 16 wherein each of the body members is constructed so that the top surface forms two ridge portions running parallel to the channels formed in the lower surface of the respective body members.

18. A hydrofoil apparatus as defined in claim 16 wherein the means for connecting the other end of each of the strut members to the respective body members is constructed and arranged to pivotally connect said other end of each of the strut members to the respective body members between the highest projection of the upper surface and the bottom surface of the respective body member to permit the body members to rotate a predetermined amount relative to the strut members to change the angle of attack of the body members.

References Cited in the file of this patent

UNITED STATES PATENTS

| | | |
|---|---|---|
| 1,190,755 | Hahn | July 11, 1916 |
| 1,776,700 | Pegna | Sept. 23, 1930 |
| 1,815,303 | Kloen | July 21, 1931 |
| 2,422,388 | Billings | June 17, 1947 |
| 2,890,672 | Boericke | June 16, 1959 |

FOREIGN PATENTS

| | | |
|---|---|---|
| 382,812 | Great Britain | Nov. 3, 1932 |
| 795,223 | France | Jan. 2, 1936 |